(12) United States Patent
Zhu (10) Patent No.: US 8,036,598 B1
(45) Date of Patent: Oct. 11, 2011

(54) PEER-TO-PEER TRANSFER OF FILES WITH BACK-OFFICE COMPLETION

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 689 days.

(21) Appl. No.: 11/858,112

(22) Filed: Sep. 19, 2007

(51) Int. Cl.
*H04B 7/00* (2006.01)
*H04M 3/16* (2006.01)
*H04L 12/58* (2006.01)

(52) U.S. Cl. ............ 455/41.2; 455/41.1; 455/41.3; 455/411; 455/412.1; 709/224

(58) Field of Classification Search .......... 455/41.1, 455/41.2, 41.3, 411, 412.1; 709/224
See application file for complete search history.

(56) References Cited

U.S. PATENT DOCUMENTS

| | | | |
|---|---|---|---|
| 7,340,214 B1* | 3/2008 | Hamberg | 455/41.2 |
| 7,619,999 B2* | 11/2009 | DaCosta | 370/312 |
| 7,957,691 B1 | 6/2011 | Lee | |
| 2002/0172368 A1 | 11/2002 | Peterka | |
| 2007/0130210 A1* | 6/2007 | Park | 707/104.1 |
| 2008/0010372 A1* | 1/2008 | Khedouri et al. | 709/224 |
| 2008/0092181 A1 | 4/2008 | Britt | |
| 2008/0132167 A1* | 6/2008 | Bent et al. | 455/41.2 |
| 2008/0165906 A1* | 7/2008 | Ho et al. | 375/354 |
| 2008/0271095 A1* | 10/2008 | Shafton | 725/87 |
| 2009/0077220 A1* | 3/2009 | Svendsen et al. | 709/224 |
| 2010/0030867 A1 | 2/2010 | Yao | |

OTHER PUBLICATIONS

Lee, Wing K., Patent Application entitled, "Distributing Content to Mobile Devices," filed Nov. 26, 2007, U.S. Appl. No. 11/945,076.
Office Action dated Jun. 25, 2010, U.S. Appl. No. 11/945,076, 11 pages.
Final Office Action dated Nov. 29, 2010, U.S. Appl. No. 11/945,076.
Notice of Allowance dated Feb. 3, 2011, U.S. Appl. No. 11/945,076.

* cited by examiner

*Primary Examiner* — Wen Huang (57) ABSTRACT

A method of data transfer using short range technology. An originating short range wireless technology enabled device wirelessly communicates a first portion of content to a destination short range wireless technology enabled device along with location information that enables retrieval of a remaining portion of the content from a back office location. The destination short range wireless technology enabled device processes the first portion of content. The remaining portion of the content may be retrieved for processing by the destination short range wireless technology enabled device before the completion of processing of the first portion of content.

20 Claims, 4 Drawing Sheets

PEER-TO-PEER TRANSFER OF FILES WITH BACK-OFFICE COMPLETION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Short range wireless technology enables the transfer of data between devices. The devices usually must either make physical contact or pass within a close range of each other in order for data transfer to occur. Multiple passes are often required in order to accomplish a complete data transfer of large amounts of data. Transferring large amounts of data may also require the devices to remain in a close proximity or be in contact with each other for an extended period of time. The quality of service and user experience when using short range wireless technology may be negatively impacted when the user has to wait a long period of time for a complete data transfer before using the data.

SUMMARY

As embodied herein and described in this disclosure, a wireless network comprising first and second short range wireless technology devices and an application is provided. The application when executed, promotes a wireless communication of content from the first short range wireless technology enabled device to the second short range wireless technology enabled device. The content may consist of a first portion of the content and location information of at least the second portion of the content. The wireless network may also include a server that hosts content data including the second portion of the content.

In a second embodiment, a method of data transfer is described. The method involves wirelessly transmitting media from a first short range wireless technology enabled device to a second short range wireless technology enabled device. The media includes a first portion of the media, location information for a second portion of the media and digital rights management authorization information. The second portion of the media is not present on the first short range wireless technology device.

Yet another embodiment disclosed herein provides a communications network comprising a first device configured to transfer a digital rights management (DRM) credential and a location designation via peer-to-peer communications to a second device. The network also includes a server that contains data referenced by the location designation. The second device uses the DRM credential and the location designation to access the data from the server and plays back the data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

As used herein, the terms data, information, content, and content information may be used interchangeably to represent audio, video, text and commands. The audio may include voice, music, audible speech, ring tones, or other such sounds or a combination thereof. Video may include motion pictures, still pictures, graphics, other digitized or optical images or a combination thereof. Text may include alphanumeric characters, electronic symbols or characters or a combination thereof. Commands may include codes, special software commands, such a functions or routines, or other software instructions or comments. The format of the data, information, content and content information may be encrypted, encoded, compressed, decompressed, or may conform to a particular standard such as JPEG (Joint Photographic Experts Group), or a version of JPEG, MPEG (Motion Picture Experts Group) or a version of MPEG or other standard. Other formats would be obvious to one of ordinary skill in the art. It should also be recognized that numerous classes and types of data, information, content, and content information may exist and the specific examples listed above are not intended to be an exclusive or exhaustive listing of those classes and types.

Data transfer between devices using a short range wireless technology such as Bluetooth communication, WiFi communication, infrared communication, Near Field Communication (NFC) and other wireless communication may be performed efficiently and quickly using a peer-to-peer protocol. In some embodiments, wired communications, such as universal serial bus (USB), IEEE-1394 firewire, or other wired communication technology may be employed. In the peer-to-peer data transfer disclosed, a first peer or originating short range wireless technology enabled device may send content to a second peer or destination short range wireless technology enabled device. The content may be limited to a portion of information, that is, a first or initial portion of information. The content may also include location information providing the site of a remaining portion of the information. The second peer or destination short range wireless technology enabled device receives the content and may be able to immediately process the portion of information. Depending on the format of the information, processing may include, but not exclusively so, playing the information, displaying the information, or a combination thereof. While processing the portion of information, the destination short range wireless technology enabled device may use the location information provided to retrieve the remaining portion of the information from a back-office location. In an embodiment, the remaining portion of the information stored at the back-office location may be protected with digital rights management (DRM) techniques and the content may include a DRM credential or other authorization information. In an embodiment, additional authentication or authorization information may be transmitted with the content, for example a user name or a user identification, a user password, and other such information.

The back-office location may be a server or other type of electronic storage site or location. The remaining portion of information may then be available to the destination short range wireless technology enabled device for processing and subsequent use. The peer-to-peer transfer of content that includes a portion of an information and location information of a remaining portion of the information allows for a quick and transparent reception of data by a short range wireless technology enabled device. The device may begin to use the initial portion of the information immediately while retrieving the remaining portion of information, processing the remaining portion of information after completing processing of the initial portion of information.

For purposes of this disclosure, an short range wireless technology enabled device refers to any device that may include the technology to enable a short range wireless communication of content. The communication may either be contactless or may require the devices to touch or make contact with each other. The wireless technology may include, without any exclusive limitation, BlueTooth®, ZigBee, IrDA, WiMAX (Worldwide Interoperability for Microwave Access), Gen2 RFD (Radio Frequency Identification) and WiFi. The technology may be integrated into many types of electronic devices including, but not exclusive to, mobile computers, such as laptops, PDAs (personal digital assistants), and tablet computers; mobile handsets, such as cellular phones, smart phones, and cordless phones; desktop computers, such as home computers, personal computers and workstations; video players, such as set top boxes, video game consoles, and televisions; and audio players, such as radios, MP3 players and iPods. The listing of electronic devices is not intended to be exhaustive or in any way limiting.

Figure 1:
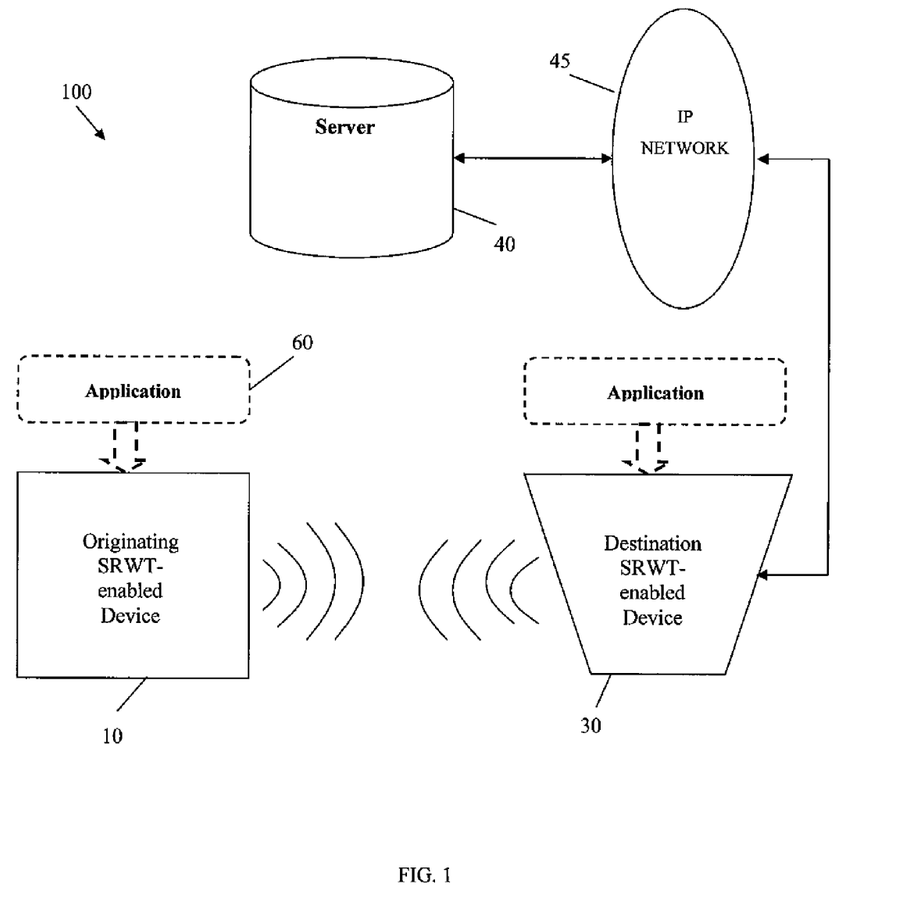
FIG. 1 shows a network in accordance with an embodiment of the disclosure.

The network 100 of FIG. 1 features a first or originating short range wireless technology enabled device 10 operating in peer-to-peer mode that wirelessly sends content data to a second or destination short range wireless technology enabled device 30. The originating short range wireless technology enabled device 10 and/or destination short range wireless technology enabled devices 30 may include an application 60 that may be configured to establish the peer-to-peer transfer. The application may also be configured to facilitate the performance of certain operations specific to a particular operating network or other system or environment.

The network may also include a server 40 in communication with the originating short range wireless technology enabled device 10 or destination short range wireless technology enabled device 30, for example communicating via an Internet Protocol (IP) network 45. The server 40 may be configured to host content or information that may be used by the short range wireless technology enabled devices. It should be understood that network 100 represents a basic network system for exemplary purposes of this disclosure and other variations of the network are possible. For example, the network 100 may include multiple short range wireless technology enabled devices that represent multiple origination and/or destination points. Additionally multiple servers may be used to host content or information. These alternate variations and configurations would be obvious to one of ordinary skill in the art. In another embodiment, the peer-to-peer communication may be promoted by wired technology, for example USB or firewire technology.

In FIG. 1, the originating short range wireless technology enabled device 10 may contain content that includes an initial portion of information along with location information of the remaining portion of the information. An application 60 on device 10 may be operable to enable the wireless transfer of the content from the originating short range wireless technology enabled device 10 to a destination short range wireless technology enabled device 30.

The application 60 may be written in a high level programming language, such as JAVA® or MATLAB®, C++, or it may be firmware on a microprocessor resident on the first device 10. Other forms of application software corresponding to various device interfaces may also be used as would be obvious to one of ordinary skill in the art. The application 60 many enable the wireless transfer of data using short range wireless technology or some other short range wireless data transfer technology such as described above. Short range wireless technology may also be used in this disclosure to enable the use of other wireless short range data transfer technology.

In one embodiment, the destination short range wireless technology enabled device 30 may receive the content and begin to process, such as play or present, the initial portion of information received. Processing may encompass the playing of the initial first few seconds of a song, video, or any other content. As the destination short range wireless technology enabled device 30 plays the initial portion of information, it may begin to process the location information received as part of the content transfer. The location information is used to retrieve the remaining portion of information not included in the first portion. In the present embodiment, the destination short range wireless technology enabled device 30 begins to retrieve the remaining portion around the same time as it plays the initial portion of information. This promotes a rapid start of playback of the initial portion of information with switch-over to playback the retrieved information without having to wait for initiation and buffering of the information.

In another embodiment, the destination short range wireless technology enabled device 30 may complete the processing of the initial portion of information before the remaining portion of information has been completely downloaded from the server 40. The destination short range wireless technology enabled device 30 will commence real-time processing of the remaining portion of information as it is streamed from the server 40 to the destination short range wireless technology enabled device 30.

The location information is any information that specifies a site or location that hosts or stores the second or remaining portion of information. The location information may be represented by a metatag. It may also be represented as a link, such as a URL (Universal Resource Locator), to a server that hosts the remaining portion of the content. Other location information formats may include pointers or addresses to files, databases, memory or memory locations. The location information may also consist of a series of locations that cumulatively provide the remaining portion of information. As may be obvious to one of ordinary skill in the art, location information may be provided in many formats and the examples provided are not intended to be exclusive.

The location information may reference an electronic site or location that may be part of a back office operation. The location information may also provide a reference to a server 40 or multiple servers that are external to the originating and destination short range wireless technology enabled devices 10, 30. The location information may also reference a location that is internal to the destination short range wireless technology enabled device 30 or other external device. The electronic site or location may also be a memory, database, or other storage location suitable for hosting electronic data as may be obvious to one skilled in the art.

The server 40 may be a secure server, such as a digital rights management server, or the electronic location may contain files or data that are digital rights management protected or similarly secured. Digital rights management protected servers or files may require a key or some form of authorization credentials to permit access to the files, data or the server. If the remaining data content is stored in a digital rights management protected environment, the originating short range wireless technology enabled device 10 will generate or provide the rights or credentials necessary to access the remaining portion of information on the server and include that digital rights management information as part of the wireless transfer of content. The credentials may take the form of a digital credential certificate, authentication information, password or other login information, or other access rights that would provide validation in a digital rights management or other secure environment. In an embodiment, the initial portion of information may comprise the rights or credentials information and the location information and contain none of the actual playback information.

The second or remaining portion of information may be appended to the initial or first portion of information and played or processed following the processing of the initial information portion by the short range wireless technology enabled device 30. The second portion of information may be only a partial portion of a complete information or it may represent the complete information. The second portion information may further include additional location information for other remaining portions of information, such as a third or fourth portion of information.

In addition to the location information of the remaining portion of information, the wirelessly transmitted content may also include digital rights management authorization information, key credentials, security codes, or other authentication information necessary to enable access to a server or other electronic storage sites or information protected by security protocols such as digital rights management.

The retrieval of the remaining portion of information by a destination short range wireless technology enabled device 30 may be sufficiently transparent to an external user or other observer so that it may not be obvious that the content wirelessly transferred from the originating short range wireless technology enabled device only contained a portion of information. The transparency may be attributed to the destination short range wireless technology enabled device 30 processing or playing the initial portion of information before initiating the downloading of the remaining portion of the information prior to completion of the processing of the initial portion of information by the destination short range wireless technology enabled device 30.

The amount or quantity of the initial portion may be related to a timeframe to retrieve all or a portion of the remaining portion. The timeframe may include multiple factors. One factor may be the time for a destination short range wireless technology enabled device 30 to access information from a server 40, memory, database or other electronic location. This time factor may be denoted by an access time, $t_{ac}$. Another time factor may include the time it takes a destination short range wireless technology enabled device 30 to acquire or download data from a server 40 memory, database or other electronic location where the remaining portion of information may be stored. This time factor may be denoted by a data transfer latency time, $t_d$. Depending on the type of information data, $t_d$ may also include buffering or necessary preprocessing, such as decoding or decompression. The $t_d$ may also include a browser or other application activation delay time. The total timeframe considered may then be equal to a minimum threshold time, $t_{thres}$, where $t_{thres}=t_{ac}+t_d$.

The threshold time, $t_{thres}$, may regulate the amount of the initial portion of information provided in the content. The $t_{thres}$ may be programmed into the originating short range wireless technology enabled device 10 or it may be automatically selected on-the-fly from a menu of threshold times that have been predetermined as relevant to a particular network environment or system. Other ways of selecting the $t_{thres}$ for a particular wireless communication transfer may be practicable as would be obvious to one of ordinary skill in the art.

Figure 2:
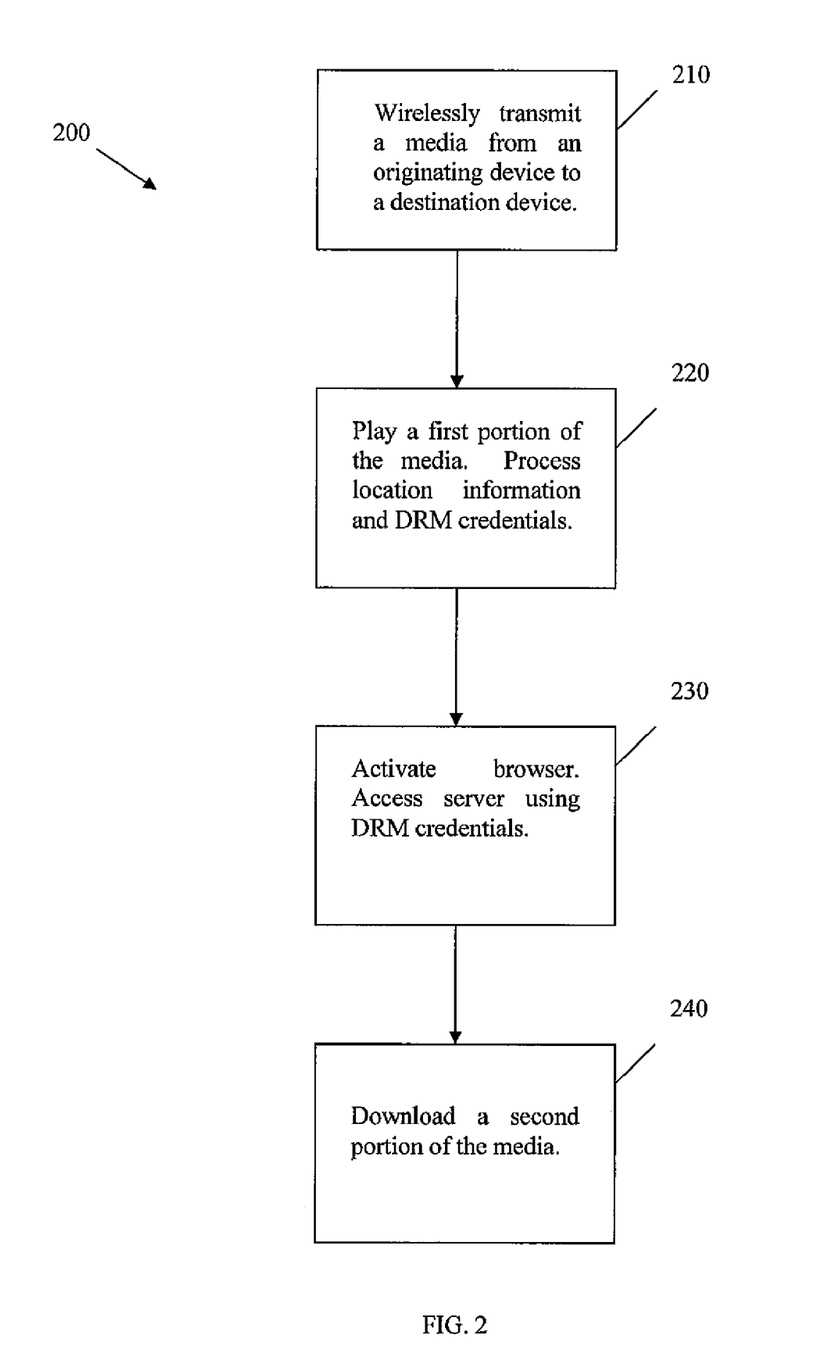
FIG. 2 is a flow chart of a method according to one embodiment of the disclosure.

FIG. 2 shows a flow chart 200 according to an embodiment of the present disclosure. In block 210, a wireless transmission of media from an originating short range wireless technology enabled device to a destination short range wireless technology enabled device is performed. The term media, as used herein, connotes all types of content, as denoted earlier in this disclosure, but particularly, video, audio or a combination thereof. The media includes a first portion of an information or media and may also include location information for a second portion of the information. The media may also include security codes, credentials or other authorization information, such as may be relevant to digital rights management.

At a block 220, the destination short range wireless technology enabled device processes or plays the first portion of information received in the media. In an embodiment, digital rights management (DRM) credential information may be included in the information received in the media. While playing the first portion of information, the destination short range wireless technology enabled device may, based on the location information provided as part of the media, activate its internal device application, such as a browser or an external browser, at a block 230. Although a browser is mentioned, any utility, application or other system might be used to retrieve the second portion of information. The browser may provide access to the second portion of information at the location specified by the location information. The location may be a secured electronic site which may require authorization or other authentication information, for example DRM credentials. This authorization information could be generated or provided by the originating short range wireless technology enabled device and included as part of the media transmission.

At a block 240, the second portion of information stored at the site provided by the location information may be downloaded or transferred to the destination short range wireless technology enabled device for processing. Various protocols may be used to transfer or download the information as may be obvious to one of ordinary skill in the art. Depending on the particular network, these may include peer-to-peer, Hypertext Transfer Protocol (HTTP), Session Initiation Protocol (SIP), Realtime Transport Protocol (RTP), File Transfer Protocol (FTP), or other such data transfer protocols.

Figure 3:
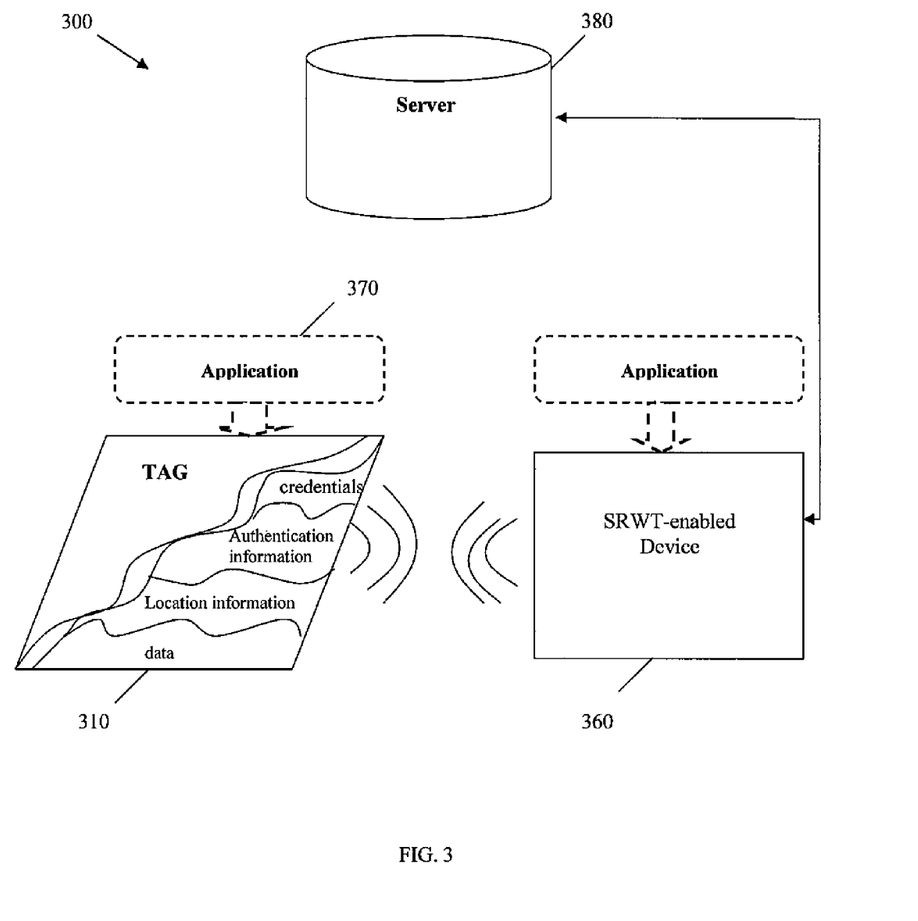
FIG. 3 shows a block diagram of another embodiment of the disclosure.

FIG. 3 illustrates a wireless communication network 300 according to another embodiment of the present disclosure. Communications network 300 comprises a Radio Frequency Identification (RFID) tag 310 that stores content and an short range wireless technology enabled device 360 operable to receive the stored content. The RFID tag 310 may be an active type of tag or it may be a passive type of tag. A passive RFID tag may hold content that may only be read in response to a request communicated and powered by an short range wireless technology enabled device. An active RFID tag having an independent power source may generate responses that provide content in response to a request. The RFID tag may be located external to a device or may be located internal to a device as part of a module.

The short range wireless technology enabled device 360 may promote a wireless transfer of content from the RFID tag 310 by coming into a close proximity or making contact with the RFID tag 310. As detailed earlier in the disclosure, the content may include various types of data or information that encompasses various formats. Specifically, the content to be transferred may include a first portion of data, location information of a second portion of data, and other information such as security authentication credentials or digital rights management related credentials.

The communications network 300 may also include an application 370 that enables the wireless transfer of content from the RFID tag 310 to the short range wireless technology enabled device 360. The application 370 may be included as part of the software or firmware that might be resident within the RFID tag or the short range wireless technology enabled device 360. The RFID tag 310 and the short range wireless technology enabled device 360 may wirelessly transfer content using, for example, a peer-to-peer protocol. The wireless transfer of content may also be performed through a reader mode where the short range wireless technology enabled device 360 reads the content stored on a passive RFID tag.

The short range wireless technology enabled device 360 receives and processes the first portion of the media. The first portion of the media may represent a complete data portion or may be only a partial portion of data. In an embodiment, the initial portion of information may comprise the rights or credentials information and the location information and contain none of the actual playback or data information. While processing the first portion, the device 360 may activate a browser that uses the location information as a link to the second portion of information or an electronic site that hosts the second portion of information.

The electronic site that hosts the second portion of information may be a server 380, memory or other such electronic storage that may be obvious to one skilled in the art. The server or information may be secured or protected by security features, such as digital rights management, and may require login information or other authentication information to be provided prior to allowing site or information access. The content transferred by the RFID tag 310 would include any authentication information required for access.

The second portion or remaining portion of information may be downloaded to the short range wireless technology enabled device 360. The second or remaining portion of information could then be processed by the short range wireless technology enabled device 360 following the completion of the processing of the first data portion of information.

Figure 4:
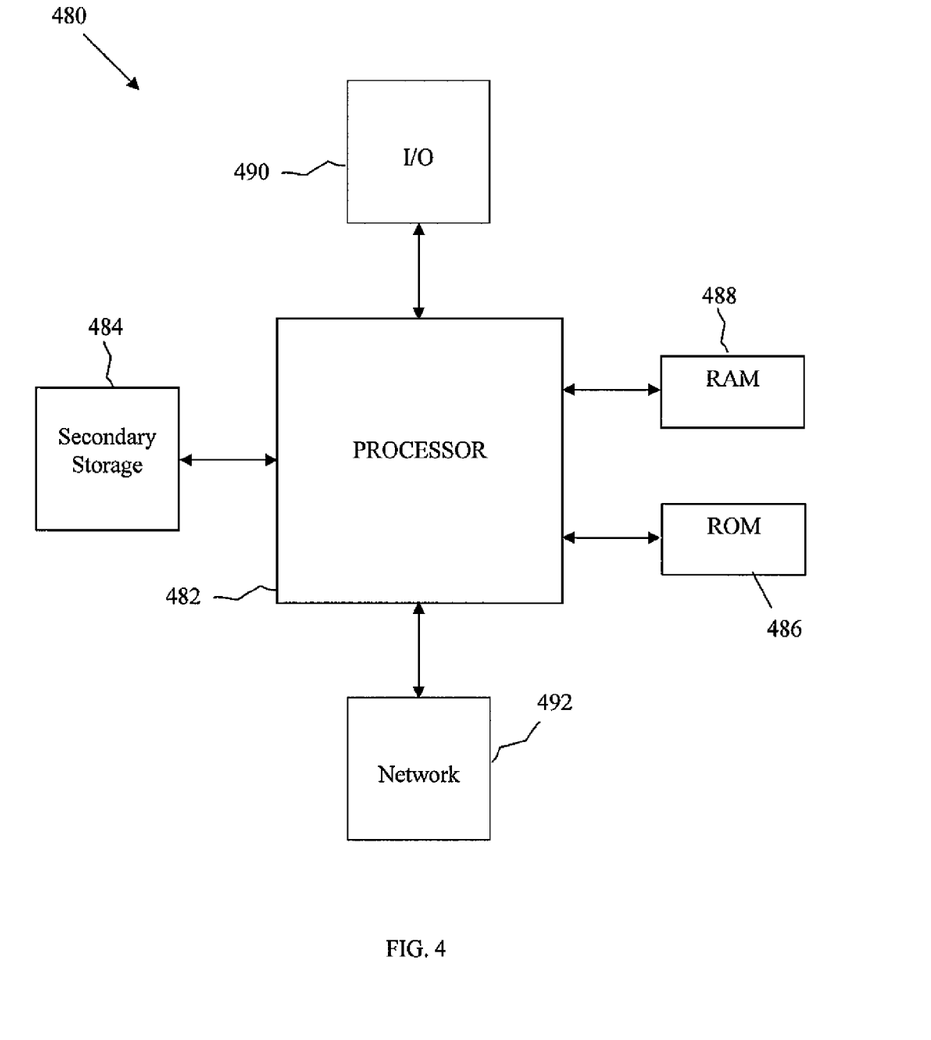
FIG. 4 is an illustrative general purpose computer system suitable for implementing the embodiments of the disclosure.

The network system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) 490 devices, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs or other applications which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless network comprising:
a first short range wireless technology enabled device;
a second short range wireless technology enabled device; and
an application, which when executed, promotes a wireless communication of content from the first short range wireless technology enabled device to the second short range wireless technology enabled device, the content including a first portion of the content and a location information of at least a second portion of the content,
wherein the first portion of the content and the second portion of the content comprise the same type of content, and
wherein the second short range wireless technology enabled device processes the location information in a manner transparent to a user and downloads the second portion of the content from the location information while simultaneously playing the first portion of the content.

2. The wireless network of claim 1, wherein the application is a peer-to-peer software application.

3. The wireless network of claim 2, further comprising a server that hosts the second portion of the content.

4. The wireless network of claim 3, wherein the server is a digital rights management server.

5. The network of claim 3, wherein the application has a configuration that determines an amount of the first portion of content.

6. The network of claim 5, wherein the application configuration is determined by a threshold time, $t_{thres}$.

7. The network of claim 2, wherein the second short range wireless technology enabled device is one of a mobile phone, mobile handset, mobile computer, video player, and audio player.

8. A method of data transfer comprising:
wirelessly receiving, by a second short range wireless technology enabled device, a media from a first short range wireless technology enabled device, the media including a first portion of the media, location information for a second portion of the media, and digital rights management authorization information, wherein the first portion of the media and the second portion of the media comprise the same type of media, and wherein the second portion is not present on the first short range wireless technology device; and
processing, by the second short range wireless technology enabled device, the location information in a manner transparent to a user to obtain the second portion of the media,
wherein the second portion is transmitted to the second short range wireless technology enabled device using the location information for the second portion to promote playing the second portion in a seamless manner after the first portion without substantial wait for initiation or buffering after playing the first portion.

9. The method of claim 8, further comprising:
playing the first portion of the media on the second short range wireless technology device while substantially simultaneously processing the digital rights management authorization information in a transparent manner to a user.

10. The method of claim 9, wherein substantially simultaneously processing the digital rights management authorization and location information comprises:
accessing a server based on the digital rights management authorization;
activating a browser on the second short range wireless technology device from the server based on the location information and digital rights management authorization; and
downloading the second portion of the media from the server before a completion of the playing.

11. The method of claim 10, wherein the accessed server is a digital rights management server that hosts the second portion of the media.

12. The method of claim 11, wherein the second portion of the media further includes a link to a third portion of information.

13. The method of claim 9, wherein a size of the first portion of the media is determined by a threshold time $t_{thres}$, and wherein $t_{thres}=t_{ac}+t_d$, with $t_{ac}$ denoting an access time and $t_d$ denoting a data transfer latency time.

14. The method of claim 9, wherein the first portion of the media further includes rights and credentials for access to the second portion of the media.

15. The method of claim 8, wherein the media is wirelessly transmitted via a short range wireless technology selected from a group consisting of Bluetooth, ZigBee, IrDa, WiMAX, Gen2 RFID and 802.11 WiFi.

16. The method of claim 15, wherein the second portion of the media is digital right management protected.

17. A communications network comprising:
a first device configured to transmit a first portion of content, a digital rights management (DRM) credential, and a location designation of a second portion of the content via peer-to-peer communications, wherein the first portion of the content and the second portion of the content comprise the same type of content;
a server containing the second portion of the content referenced by the location designation; and
a second device configured to receive the first portion of the content, the DRM credentials, and the location designation from the first device via the peer-to-peer communication, to provide the DRM credential to the server, to access the second portion of the content referenced by the location designation from the server, and to playback the content, wherein the second device processes the location designation in a manner transparent to a user.

18. The communications network of claim 17, wherein the peer-to-peer communication is promoted by one of infrared communications technology, Bluetooth technology, WiFi technology, near field communications (NFC) technology, universal serial bus (USB) technology, and IEEE-1394 firewire technology.

19. The communications network of claim 17, wherein the first device is a radio frequency identification (RFID) tag.

20. The communications network of claim 17, wherein the second device processes the location designation by accessing the second portion of the content referenced by the location designation from the server.

* * * * *